US012539346B2

(12) United States Patent
Bernstein et al.

(10) Patent No.: US 12,539,346 B2
(45) Date of Patent: Feb. 3, 2026

(54) RECYCLING AROMATHERAPY DEVICE

(71) Applicant: LIFELINES, LLC, Westport, CT (US)

(72) Inventors: Melissa Bernstein, Westport, CT (US); Devin Coakley, Bellingham, MA (US)

(73) Assignee: Lifelines, LLC, Westport, CT (US)

( * ) Notice: Subject to any disclaimer, the term of this patent is extended or adjusted under 35 U.S.C. 154(b) by 415 days.

(21) Appl. No.: 18/228,499

(22) Filed: Jul. 31, 2023

(65) Prior Publication Data

US 2025/0041471 A1    Feb. 6, 2025

(51) Int. Cl.
*A61L 9/14* (2006.01)
*A61L 9/013* (2006.01)
*C11B 9/00* (2006.01)

(52) U.S. Cl.
CPC .............. *A61L 9/14* (2013.01); *A61L 9/013* (2013.01); *C11B 9/00* (2013.01); *A61L 2209/111* (2013.01); *A61L 2209/12* (2013.01)

(58) Field of Classification Search
CPC ............... A61L 9/013; A61L 9/14; C11B 9/00
See application file for complete search history.

(56) References Cited

U.S. PATENT DOCUMENTS

| | | | |
|---|---|---|---|
| 7,934,703 B2 | 5/2011 | Tomono | |
| 7,963,460 B2 | 6/2011 | Jorgensen | |
| 7,992,801 B2 | 8/2011 | Jorgensen | |
| 8,133,440 B2 | 3/2012 | Jorgensen | |
| 8,196,903 B2 | 6/2012 | Jorgensen | |
| 9,078,938 B2 | 7/2015 | Hsiao | |
| 9,914,145 B2 | 3/2018 | Osborn | |
| 10,905,787 B2 | 2/2021 | Meng | |
| 11,628,463 B2 * | 4/2023 | Hsiao | F24F 8/50 392/403 |
| 2008/0245362 A1 | 10/2008 | Moessis | |
| 2011/0024521 A1 | 2/2011 | Jorgensen | |
| 2014/0263722 A1 | 9/2014 | Hsiao | |
| 2017/0354753 A1* | 12/2017 | Sevy | B05B 1/262 |
| 2018/0333735 A1* | 11/2018 | Song | A63J 5/00 |
| 2022/0111411 A1* | 4/2022 | Panton | H01M 10/0525 |

FOREIGN PATENT DOCUMENTS

| | | |
|---|---|---|
| GB | 2471069 | 5/2011 |
| GB | 2473288 | 5/2012 |

* cited by examiner

*Primary Examiner* — Timothy C Cleveland
(74) *Attorney, Agent, or Firm* — Wissing Miller LLP (57) ABSTRACT

An aroma therapy device atomizes an aromatherapy solution and recaptures a portion of the water in the solution. The device includes a lid, main body, and base. The base houses electrical components. The main body is coupled with the base and defines a reservoir holding the solution and an air channel therethrough. An umbrella deflects air traveling through the air channel across the solution the reservoir to entrain the mist. The lid is attached to the main body. And a bowl within the lid includes fluting defining a gap that allows the entrained mist to travel from the reservoir into the lid. The lid includes arcuate walls that direct the mist towards the center of the device. Aromatic substances evaporate from mist particles traveling through the lid to generate an aromatherapy scent. The mist impacts the bowl where it condenses and is recycled into the reservoir.

13 Claims, 10 Drawing Sheets

| POWER STATE INDEX | MIST PRODUCTION LEVEL | TARGET MIST PRODUCTION |
|---|---|---|
| 0 | OFF | 0 |
| 1 | LOW | 20 mL/hr |
| 2 | MEDIUM | 30 mL/hr |
| 3 | HIGH | 45 mL/hr |

| COLOR INDEX | RGB VALUES | | |
|---|---|---|---|
| | R | G | B |
| 0 | 0 | 0 | 0 |
| 1 | 239 | 138 | 65 |
| 2 | 255 | 208 | 157 |
| 3 | 244 | 248 | 213 |
| 4 | 176 | 218 | 227 |
| 5 | 93 | 173 | 206 |

RECYCLING AROMATHERAPY DEVICE

BACKGROUND OF THE INVENTION

1. Field of the Invention

The present disclosure relates to an aroma therapy device utilizing a vaporizing element, for example an ultrasonic atomizer, heat atomizer, or nebulizer. More particularly, the present disclosure relates to an aroma therapy device that is configured to release vapors from a volatile substance dissolved in water and to recapture at least a portion of the water used when operating the device.

2. Description of the Related Art

Aromatherapy is a technique for improving emotional and/or physical health of a person by providing aromatic scents. Such scents may be provided by evaporating volatile liquids such as essential oils. Utilizing essential oils for aroma therapy has many benefits. These scents may be used to reduce stress, increase focus, give an energy boost, and more. Furthermore, these oils give a home, business, or other location a welcoming smell.

Aroma therapy diffusers vaporize aromatic ingredients, such as essential oils, to release the scents into the atmosphere. Some diffusers include ultrasonic atomizers, nebulizers, or heat atomizers connected with a liquid reservoir to generate a water vapor mist that flows from the device into the ambient surroundings. An essential oil or other scent generating substance is dissolved in the water and is delivered from the device along with the mist.

Such diffusers may be designed to have a certain concentration of the essential oil dissolved in the water. For example, a recommended concentration of oil in water may be about a2% solution. This means that the solution atomized and dispensed by the device may be made up of 98% water or more. Because the water is atomized into a mist and expelled from the device along with the essential oil, the supply of water is used up when the device is operated and needs to be replenished periodically.

Having to replenish the water supply of an aroma therapy device may limit the time such a device can be operated unattended. It may also be inconvenient to keep a supply of water on hand to refill the device when empty.

In addition, if tap water is used to fill such diffusers the water may include dissolved substances, such as minerals. Some users may be concerned that inhaling a nebulized mist including such dissolved substances could be harmful. Such users may prefer to use distilled or otherwise purified water. Providing purified water may increase the cost of operating such diffusers. Keeping a source of purified water on hand may also be inconvenient.

As described above, current methodology of aroma therapy relies on diluting a very small amount of essential oil in water and delivering both the water and the volatilized essential oil and encouraging the evaporation of the mixture to provide emotional or physical benefits.

Thus, there is a need for an aromatherapy device that allows users to achieve the benefits of aromatherapy that is more convenient, easier to operate, and easier to maintain than with known aroma therapy diffusers.

BRIEF SUMMARY OF THE INVENTION

Embodiments of the disclosure address these and other needs. According to one embodiment of the disclosure, there is provided an aromatherapy device configured to allow a volatile substance dissolved in water to evaporate to create an aroma and to recapture and reuse the water.

According to one embodiment an aroma therapy device includes a lid, a main body, and a base. The base houses or partially houses at least one printed circuit board assembly (PCBA) that is connected to the electrical components. The base is connected with and supports the main body. A reservoir is provided within the main body that holds a solution of a volatile substance dissolved in water. A vaporization or atomization element, such as an ultrasonic transducer is electrically coupled with the PCBA. The vaporizing element is mechanically coupled with the reservoir to deliver sonic energy to vaporize or atomize the solution to create a gas, an aerosol, a mist, or a vapor.

The main body defines an air passage that extends therethrough. The base includes a fan and an air inlet. The fan is electrically coupled with the PCBA and is adapted to draw air through the air inlet into the main body and along the air passage. The air passage extends through the main body, through the reservoir, and into the lid.

According to one embodiment, the reservoir is toroidal shaped with a central opening surrounded by a ring-shaped trough to hold an aroma therapy solution. An air channel extends upward through the center opening above the top of the reservoir. An umbrella is provided at the top of the air channel. Air, driven by the fan, flows upward through the air channel and encounters the umbrella and is directed downward toward the reservoir and across the surface of the liquid. The flowing air entrains atomized droplets of the liquid and flows upward from the main body and into the lid.

The lid defines an opening at the top and is connected with the main body along the lower edge of the lid. The lid houses a recapture bowl positioned below the opening of the lid and above the reservoir. Air flowing upward from the surface of the liquid flows upward from the main body and into the lid. According to one embodiment, a gap between the outer perimeter of the recapture bowl and the inside surface of the lid directs the flow of air and mist or vapor along the inside surface of the lid. Fluting may be provided along the perimeter of the recapture bowl to define a channel around the recapture bowl and along the inside surface of the lid. According to one embodiment, the size of the gap is selected to achieve a desired velocity of air flow along the inside surface of the lid.

According to one embodiment, the inside surface of the lid has an inward sloping surface so that air flow, including the entrained mist or vapor is directed radially inward across the top opening of the lid. As the mist or vapor flows past the opening at the top of the lid, volatile components, for example, dissolved essential oils, evaporate from the mist droplets and exit the device through the lid opening to provide an aroma therapy scent. According to one embodiment, the inward sloping surface of the lid directs the mist or vapor downward so that it impinges on the sides and bottom of the recapture bowl and recondenses to create liquid water. A drain hole is provided in the bottom of the recapture bowl. The drain hole is located above the umbrella in the main body. Recondensed water flows through the drain hole and down into the reservoir.

BRIEF DESCRIPTION OF THE DRAWINGS

The above and/or other aspects of the disclosure will be more apparent by describing in detail exemplary embodiments of the disclosure with reference to the accompanying drawings, in which.

DETAILED DESCRIPTION OF EXEMPLARY EMBODIMENTS

Exemplary embodiments of the disclosure will now be described below by reference to the attached Figures. The described exemplary embodiments are intended to assist the understanding of the invention and are not intended to limit the scope of the invention in any way. Like reference numerals refer to like elements throughout.

The term "distal" refers to the direction away from a resting surface supporting a device according to the disclosure. The term "proximal" refers to the direction toward the resting surface. A resting surface includes any suitable surface for the placement of the embodiment disclosed, such as, a tabletop, floor, counter, and the like.

Figure 1:
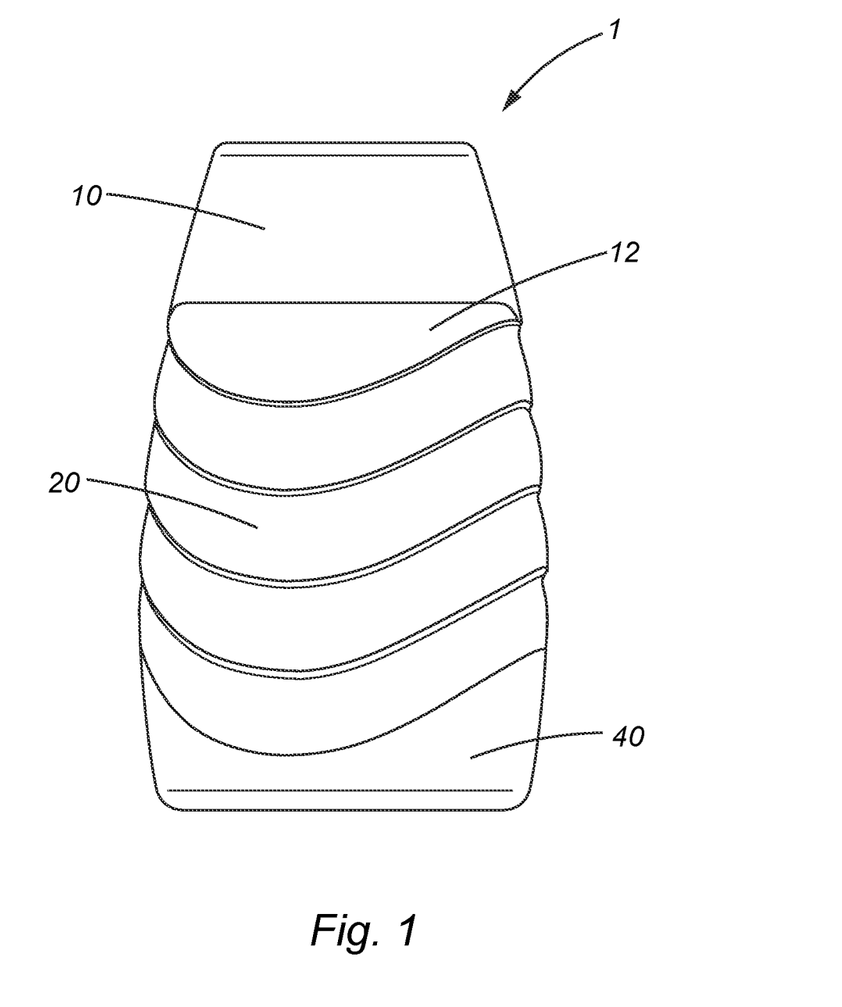
FIG. 1 is a front view of an aroma therapy device according to an embodiment of the disclosure.
Figure 2:
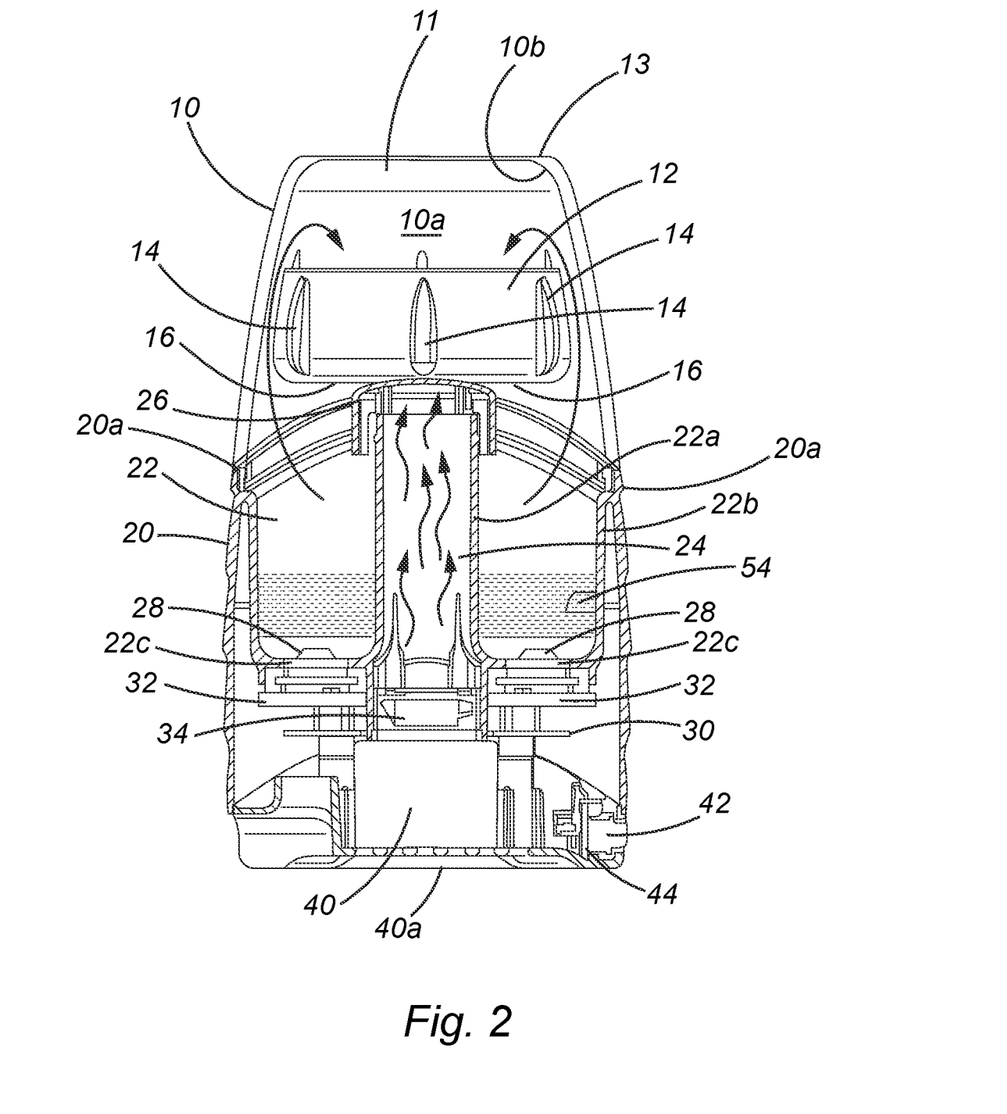
FIG. 2 is a cross section view of the aroma therapy device of FIG. 1.
Figure 3:
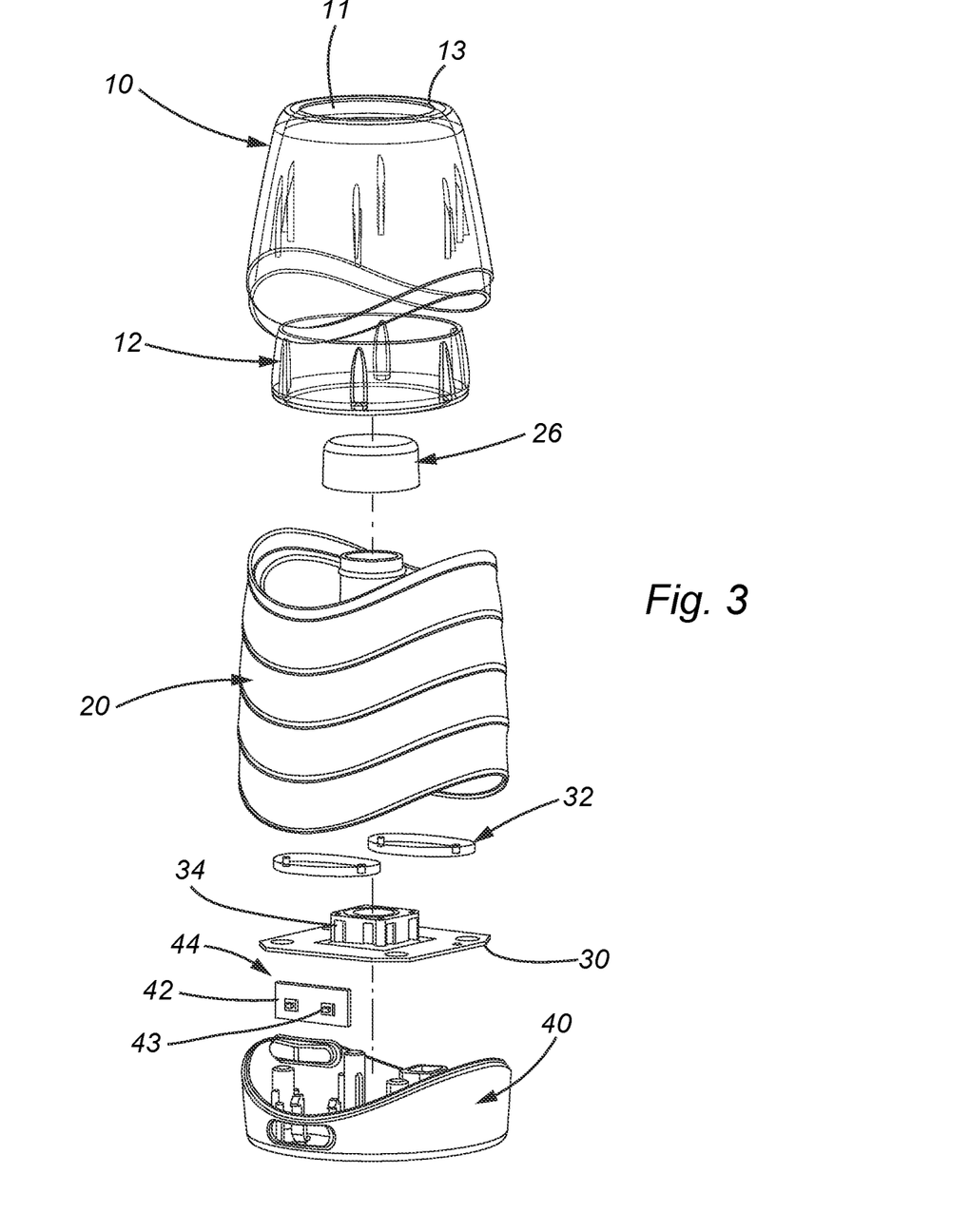
FIG. 3 is an exploded view of the aroma therapy device of FIG. 1.

FIGS. 1-3 show an aroma therapy device 1 according to one embodiment of the disclosure. A lid 10 is connected with a main body 20. According to one embodiment, lid 10 rests on a lip 20a of the main body 20 and can be lifted from the main body to access internal components, for example, to fill or refill the device with an aroma therapy solution. According to one embodiment, lid 10 and main body 20 are connected by a frictional interference fit. According to another embodiment, the lid 10 has a screw thread shaped to rotatably engage with a corresponding threaded portion of the main body 20. It is contemplated that the main body 20 may have a screw thread shaped to rotatably engage with a corresponding threaded portion of the lid 10. In another embodiment, the lid 10 is removably connected to the main body 20 by a friction fit, a snap fit interface, or by a fastener.

As shown in FIGS. 2 and 3, lid 10 has a generally tapering shape as it extends in the distal direction. According to some embodiments, lid 10 has a circular or oval cross section. Lid 10 may be formed from a polymer, a metal, a glass, or a ceramic. According to a preferred embodiment, lid 10 is formed from polypropylene. Lid 10 has an interior portion 10a and an opening 11 from which a volatile substance can evaporate when the device is in use, as will be explained below. The inside surface of lid 10 has an inwardly curving shape to direct the flow of mist entrained in the airflow toward the center of the lid and downward. A recapture bowl 12 is positioned within lid 10. According to one embodiment, bowl 12 is permanently fix with the inside surface of the lid. According to another embodiment, bowl 12 is formed integrally with lid 10, for example, by molding, adhesive, ultrasonic welding or other techniques known in the field of the disclosure. According to a preferred embodiment, bowl 12 is removably fitted within lid 10 by a friction fit or a snap fit interface. According to a most preferred embodiment, bowl 12 is positioned within lid 10 and held in place by components of main body 20 that contact a bottom surface of bowl 12. As shown in the embodiment of FIG. 2, bowl 12 rests on umbrella 26.

The bowl 12 may have a plurality of channels or flutes 14 extending radially outward and shaped to contact an inside surface of lid 10 to define a gap between the bowl and the lid. The gap allows air that has flowed across the surface of an aroma therapy liquid in reservoir 22 to flow in the distal direction along the interior surface of the lid 10a, as will be explained below. The embodiment shown in FIGS. 2 and 3, bowl 12 has four flutes 14. Various configurations utilizing fluting 14 are contemplated. For example, bowl 12 may utilize one flute 14 or more than one flute 14 to define a gap to accommodate the travel of the volatile substance from the reservoir 22 to the interior of the lid 10a. According to one embodiment, the dimensions of the gap are selected to facilitate the flow of mist-laden air across opening 11. According to one embodiment, the gap is between about 0.1 millimeter (mm) and about 10 mm. According to a preferred embodiment, the gap is between about 1.4 mm and about 2.2 mm.

As shown in FIG. 2, the main body 20 has a circular or oval cross section and defines a top lip 20a that engages with the lower edge of lid 10. The top lip 20a has the same cross section as the bottom edge of lid 10. According to one embodiment, top lip 20a forms a shelf to support lid 10. Main body 20 may be formed from a polymer, a metal, a glass, or a ceramic. According to a preferred embodiment, lid 10 is formed from polypropylene.

The main body 20 houses at least one reservoir 22 configured to hold a quantity of a liquid, such as a mixture of water and an essential oil. The reservoir 22 is constructed of an inner wall 22a, outer wall 22b, and a bottom wall 22c. These walls may be formed monolithically, for example, by injection molding a polymer material, such as polypropylene. According to one embodiment, reservoir 22 has a toroidal shape with a central opening surrounded by inner wall 22a and a ring-shaped region for holding the liquid between the inner wall 22a and outer wall 22b.

According to one embodiment, inner wall 22a extends upward in the distal direction to form an air channel 24. In one embodiment, an umbrella 26 is coupled to the distal end of the air channel 24. In another embodiment, the top of the umbrella 26 is coupled to or in contact with the bottom of recapture bowl 12.

Umbrella 26 covers the opening at the distal end of air channel 24 and defines a gap between the outside surface of air channel 24 and the inside surface of the umbrella. This configuration causes air flowing distally through air channel 24 to be directed downward in the proximal direction toward the surface of liquid held by reservoir 22.

Fan 34 is positioned at the proximal end of air channel 24 and is configured to blow air into air channel 24. According to one embodiment, fan 34 is provided on printed circuit board 30, as will be explained below. Base 40 positioned below main body 20 includes an air inlet 40a below fan 34. Fan 34 draws air in through air inlet 40a and along air channel 24. The air channel 24 is configured to direct air towards the umbrella 26 while the umbrella 26 is configured to deflect the air from the air channel 24 downward across the surface of the liquid in reservoir 22. Air flowing in through air inlet 40a increases pressure within main body 20, causing air to flow upward from reservoir 22 and into lid 10.

Figure 4:
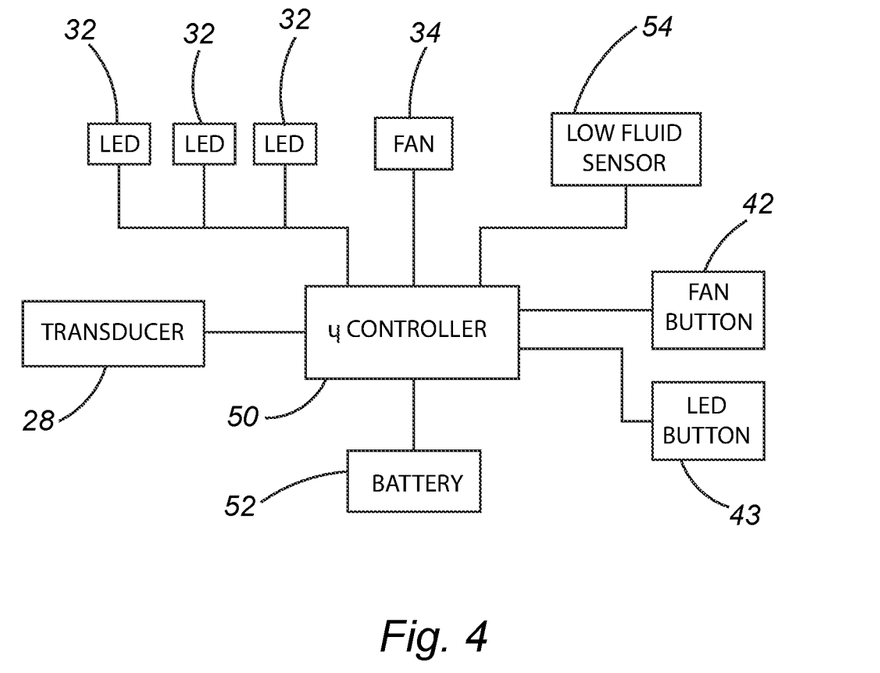
FIG. 4 is a schematic diagram showing an arrangement of components of an aroma therapy device according to embodiments of the disclosure.

Now referring to FIGS. 2, 3, and 4, the aroma therapy device 1 may include electrical and mechanical components connected with a printed circuit assembly (PCBA) 30 connected with main body 20 and/or with base 40. One or more actuators or buttons 42 and 43 may be connected with PCBA 30 or may be connected with an auxiliary PCBA 44 and electrically coupled with PCBA 30. Buttons 42, 43 may be provided on the outside surface of main body 20 or base 40 to allow a user to operate the device. According to one embodiment, PCBA 30 supports one or more light sources such as an LED array 32 that can be illuminated during operation of the device, as will be explained below. According to one embodiment, PCBA 30 supports a low fluid sensor 54 that monitors the amount of liquid in reservoir 22. PCBA 30 may include circuitry that disables operation of one or more components of the device in the event fluid in the reservoir falls below a preselected level. Also supported by PCBA 30 are one or more atomizing devices 28, such as ultrasonic transducers, PCBA 30 also includes a connection to a power source (not shown). In some embodiments, the power source comprises a battery such as one or more double-A, triple-A, or 9-volt disposable or rechargeable batteries, or any combination thereof. In other embodiments, the aroma therapy device may utilize a uniquely configured battery to power the device. According to other embodiments of the disclosure, power may be supplied to PCBA 30 by a photovoltaic cell. In other embodiments, power is supplied by a connection to an alternating current (AC) power main, for example, by a 110V wall outlet or a connection to a direct current (DC) power source, for example, by connecting the device a power outlet located within a vehicle. Fan 34 is electrically connected with the PCBA 30 and as discussed above is located at the proximal end of the air channel 24.

According to one embodiment, atomizing elements 28 are ultrasonic transducers that are mechanically coupled with bottom wall 22c of reservoir 22. According to another embodiment, portions of atomizing elements 28 extend through bottom wall 22c and are in direct contact with liquid held in reservoir 22. The atomizing element 28 is electrically coupled to the PCBA 30 and controlled by other components on the PCBA, such as by a microcontroller 50, to be energized to deliver acoustic energy to the liquid, causing the liquid to be atomized, or otherwise broken up into a mist. According to one embodiment, a user operates buttons 42, 43 to select one of a plurality of different settings, e.g., off, high, medium, and low to generate a selected rate of mist generation. In a preferred embodiment, the high setting will generate about 45 milliliters (mL) of mist per hour. More preferably, the high setting will generate between about 30 mL to about 45 mL of mist per hour. The medium setting may generate about 30 mL of mist per hour. More preferably, the medium setting will generate between about 23 and 33 mL of mist per hour. The low setting may generate about 25 mL of mist per hour. More preferably, the low setting will generate between about 17 and 27 mL of mist per hour.

Instead of or in addition to ultrasonic transducers, atomizing elements 28 can include a nebulizer, a heat atomizer, a piezo diffusion vaporizer, or other mechanisms to convert a liquid into an aerosol, a vapor, or a gas using methods know to those of ordinary skill in the field of the invention.

Fan 34 is connected with components on PCBA 30 to control operation of the device, such as a microcontroller 50. According to one embodiment, energy provided to fan 34 is selected to provide a selected flow of air. According to other embodiments discussed below, the energy provided to fan 34 is modulated to provide a varying air flow.

Referring now to FIGS. 2 and 3, the arcuate wall of the lid 10 has an inward sloping inside surface 10b configured to guide air flowing from main body 20 along the inside wall of the lid. At the distal end of the lid, that is, at the top of the device, a lip 13 of the lid curves inward so that air entraining mist generated by the atomizing element 28 is directed radially inward and downward, that is, in the proximal direction toward the center of the interior of the lid 10a. As the mist-laden air moves past opening 11 in the top of lid 10, the volatile substance (e.g., essential oil) dissolved in the aroma therapy solution evaporates, releasing an aroma therapy scent into the surrounding atmosphere. According to one embodiment, the vapor pressure of the dissolved essential oil is selected to be higher than that of water. As a result, the essential oil evaporates from the droplets of mist more rapidly than the water itself evaporates. The mist, still entrained in the flow of air, impacts the inside surface of recapture bowl 12 and recondenses into liquid water. The recondensed water flows to the bottom of recapture bowl 12. One or more holes in the bottom of recapture bowl 14 allow the water to flow downward into reservoir 22.

According to one embodiment, the aroma therapy device 1 includes one or more light sources, such as light emitting diodes (LEDs) 32 electrically connected with PCBA and controlled by microcontroller 50. Portions of lid 10, main body 20 and/or base 40 may be translucent or transparent. In the embodiment shown in FIGS. 2 and 3, main body 20 is translucent so that when the LEDs 32 illuminate the interior of the main body, the device 1 glows with selected colors generated by energizing the LEDs. In some embodiments, different colored LEDs 32, for example, red, green, and blue LEDs are provided. Under control of microcontroller 50 the LEDs are illuminated with varying relative intensities to generate different colors. Distinct colors may be associated with specific aromatherapies to improve and/or enhance a user's mood and/or mental well-being (also known as mood lights).

FIG. 4 shows a schematic diagram of electric and electromechanical components of the device. These one or more of these components may be provided on PCBA 30. According to one embodiment, controller 50 is a programable processor such as a microcontroller that includes software for performing the functions of operating the device. Controller 50 is connected with a power supply such as a battery 52. Controller selectively directs electrical power from power supply 52 to fan 34 and transducer 28. Actuation of fan button 42 causes controller 50 to operate fan 34 at a selected speed to generate mist at a selected rate as will be explained below. The actuation of LED button 43 causes controller 50 to illuminate LEDs 32 according to a selected sequence as will be explained below.

According to one embodiment fan 34 has a fixed flow rate when power is being supplied to it by controller 50, causing a constant flow of mist within lid 10 and creating a pleasing visual effect of waves of vapor. According to one embodiment, fan 34 is energized to generate a flow rate of between about 0.01 and about 0.3 cubic feet per minute (CFM). According to a preferred embodiment, fan 34 is energized to create a flow rate of about 0.2 CFM. According to a further embodiment, controller 50 includes programming to operate fan 34 at a plurality of different speeds or to modulate the fan speed according to a time-varying function, as will be explained below.

According to one embodiment, aroma therapy device 1 includes a low fluid sensor 54 configured to detect when the aroma therapy liquid in the reservoir 22 goes below a certain threshold. Some atomizing elements 28 may be damaged if they are energized when little or no liquid is present in reservoir 22. According to one embodiment, when a low fluid state is detected, microcontroller 50 disables transducer 28 until a required level of fluid is placed in reservoir 22. In an exemplary embodiment, a fluid sensor 54 may be disposed along the inner wall 22a or outer wall 22b of the reservoir 22 and may monitor the level of aroma therapy liquid optically, for example, by detecting that the low fluid sensor is uncovered by a drop in the level of aroma therapy liquid. In another embodiment, the low fluid sensor is a float sensor within the reservoir 22. According to one embodiment, microcontroller 50 detects a low fluid condition and changes the color pattern to the LEDs, for example, to emit a flashing or constant red color to alert the user that reservoir 22 needs to be replenished. In another embodiment, the low fluid sensor may be electrically coupled to an external indicator configured to provide an audible, haptic, or visual indication when the liquid in reservoir 22 falls below a certain threshold.

Referring to FIGS. 1-3, the embodiment shown has a base 40 that is connected to the main body 20. According to one embodiment, the base 40 may be permanently or non-permanently fixed to the main body 20 by a friction fit, a snap fit interface, or by a layer of adhesive, by a weld, or by a fastener. The base 40 may be configured to house or partially house the PCBA 30 and other electrical components. The base 40 may also support the one or more input devices, such as the button switches 42 and 43, that can be manually activated by a user. According to one embodiment of the present disclosure, one of the input devices (e.g., pushbutton switch 42 signals controller 50 to cycle through the four power settings, i.e., off, high, medium, and low, to vary the speed of fan 34. The other input device 43 signals controller 50 to cycle through various color pattern settings for LEDs 32, for example, off, color pattern 1, color pattern 2, and color pattern 3. LEDS 32 may generate different colors of light. By energizing LEDs 32, a pleasing visual effect may be achieved.

Figure 5:
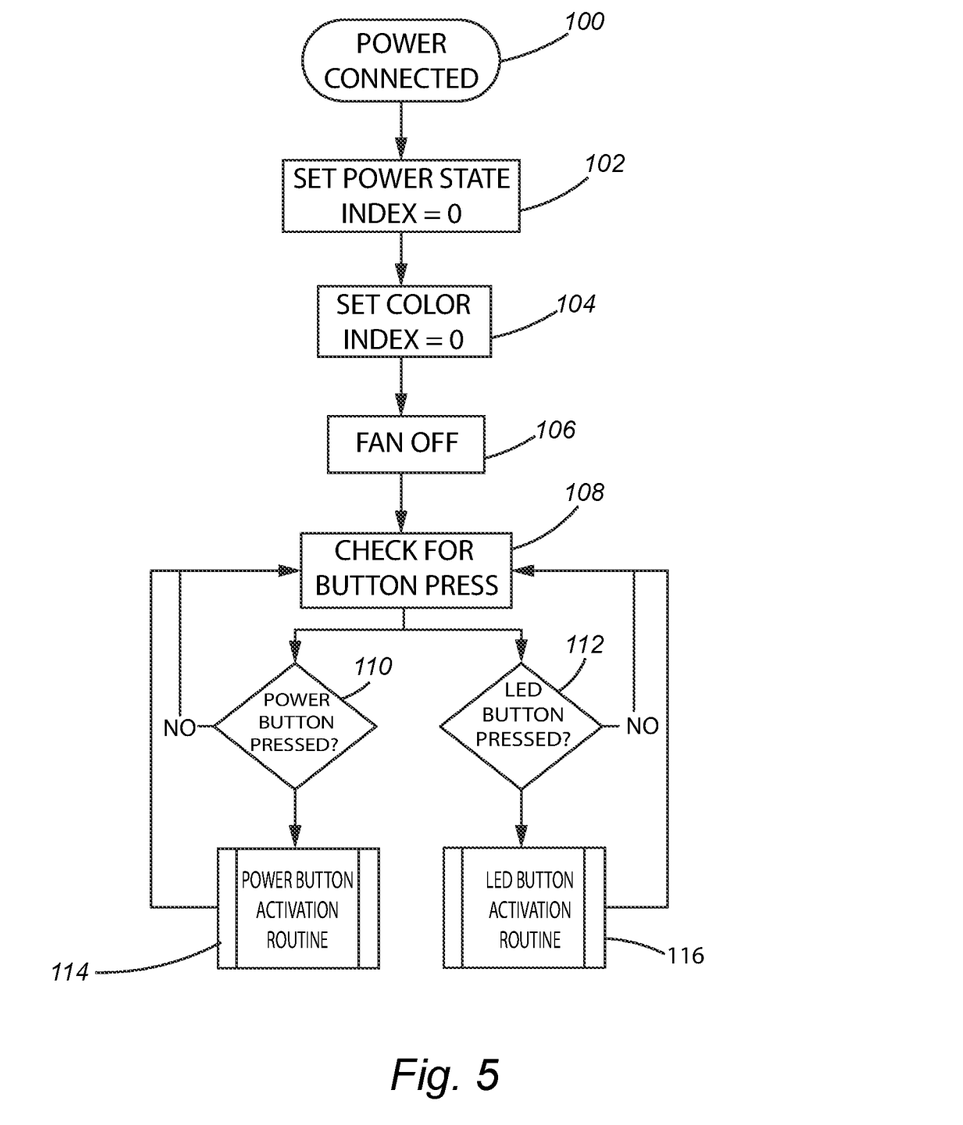
FIG. 5 is a logic flow chart showing top level control logic of an aroma therapy device according to embodiments of the disclosure.

FIG. 5 is a flow diagram showing top level control logic of the aroma therapy device according to embodiments of the disclosure. At step 100 power is supplied to the aroma therapy device, for example, by power supply 52. At step 102, controller 50 sets the power state index to 0, so that no energy is provided to transducer 28. At step 104 controller 50 sets the color index to 0, so that LEDs 32 are not illuminated. Controller 50 on PCBA 30 monitors for any actuation of buttons 42, 43 at steps 108, 110, and 112. If power button 42 is pressed, controller 50 at step 110 commences the power button activation routine at step 114. If LED button 43 is pressed, controller 50 at step 112 commences the LED Activation routine at step 116.

Figure 6:
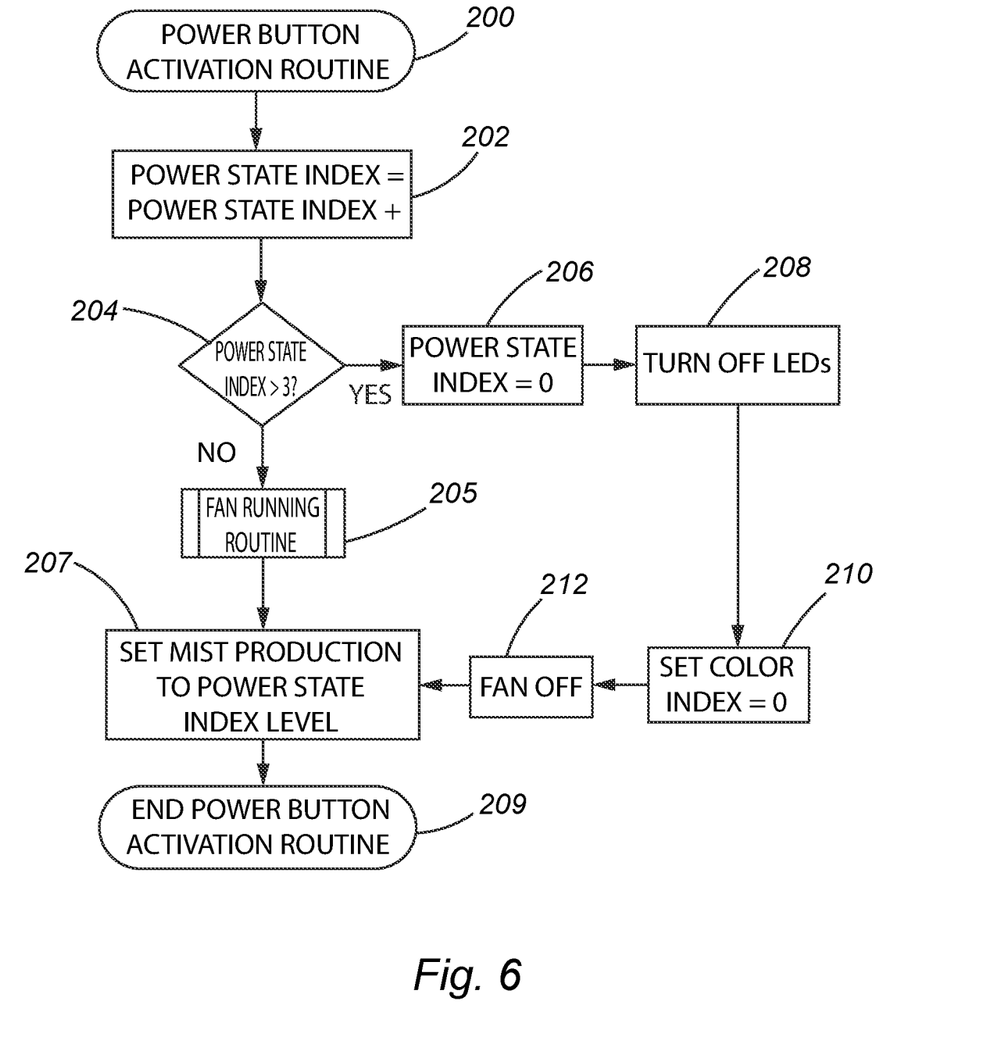
FIG. 6 is a logic flow chart showing power button activation routine of an aroma therapy device according to embodiments of the disclosure.
Figure 7:
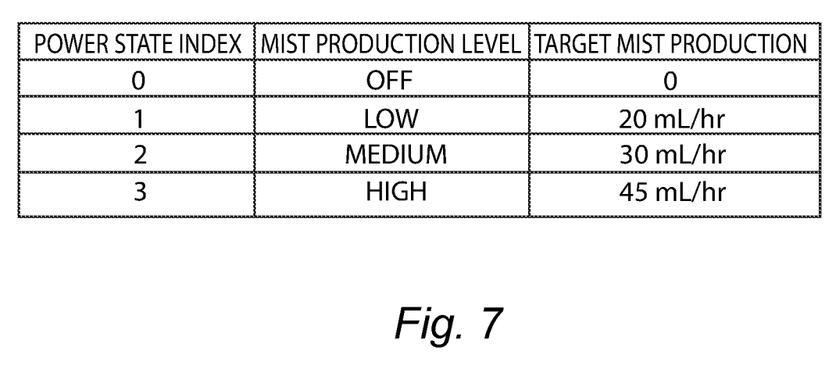
FIG. 7 is a chart showing power state index values and the corresponding mist production levels for an aroma therapy device according to embodiments of the disclosure.

FIGS. 6 and 7 show, respectively, a flow diagram of the power button activation routine and a chart associating the power state index with a mist production level. Controller 50 commences power button activation routine at step 200. As discussed above, when power is applied to PCBA 30, the power state index is set to 0 (step 102 in FIG. 5). When power button 42 is pressed, at step 202, controller 50 increase the power state index by 1 (e.g., changing the index from 0 to 1). At step 204, controller 50 checks whether the power state index is greater than three (i.e., power button 44a has been pressed more than three times since the device was powered on). If the power index is less than or equal to 3, at step 205, controller 50 commences the fan run routine (shown in FIG. 10), as explained below. At step 207, controller 50 sends power to transducer 28 and fan 34 to generate mist at a rate corresponding to the power state index. FIG. 7 shows exemplary settings for mist generation according to embodiments of the disclosure. The routine ends at step 209, where operation of controller 50 returns to step 108 of the top level logic control illustrated in FIG. 5 to check for additional presses of buttons 42 and 43.

If, at step 204 the power state index exceeds 3, then controller 50 resets the power state index to 0 at step 206, turns off any illuminated LEDs at step 208, resets the color index to 0 at step 210, and turns off fan 34 at step 212. This puts the device in an OFF condition. Controller 50 returns to step 108 in FIG. 5 to await a button press.

Repeated actuation of button 42 causes the power state index to cycle through values 0, 1, 2, and 3. For example, if the power state index is "1" and pushbutton switch 42 is actuated, the device cycles to power state index "2" and sets the mist production level corresponding to that index value. Each subsequent actuation of the pushbutton switch 42 cycles the power state index to the next power state index. In the embodiment shown, if the device is on power state index "3," the next actuation of the pushbutton switch 42 cycles the device back down to power state index of "0." This is an exemplary embodiment having three power state values. A greater or lesser number of power state values could be provided within the scope of the disclosure. According to another embodiment, instead of providing distinct power levels, a continuous variation in power level may be provided, for example, by controlling the fan 34 and/or transducer 28 a potentiometer, digital to analog converter, or other electrical power control mechanism know in the field of the disclosure.

Figure 8:
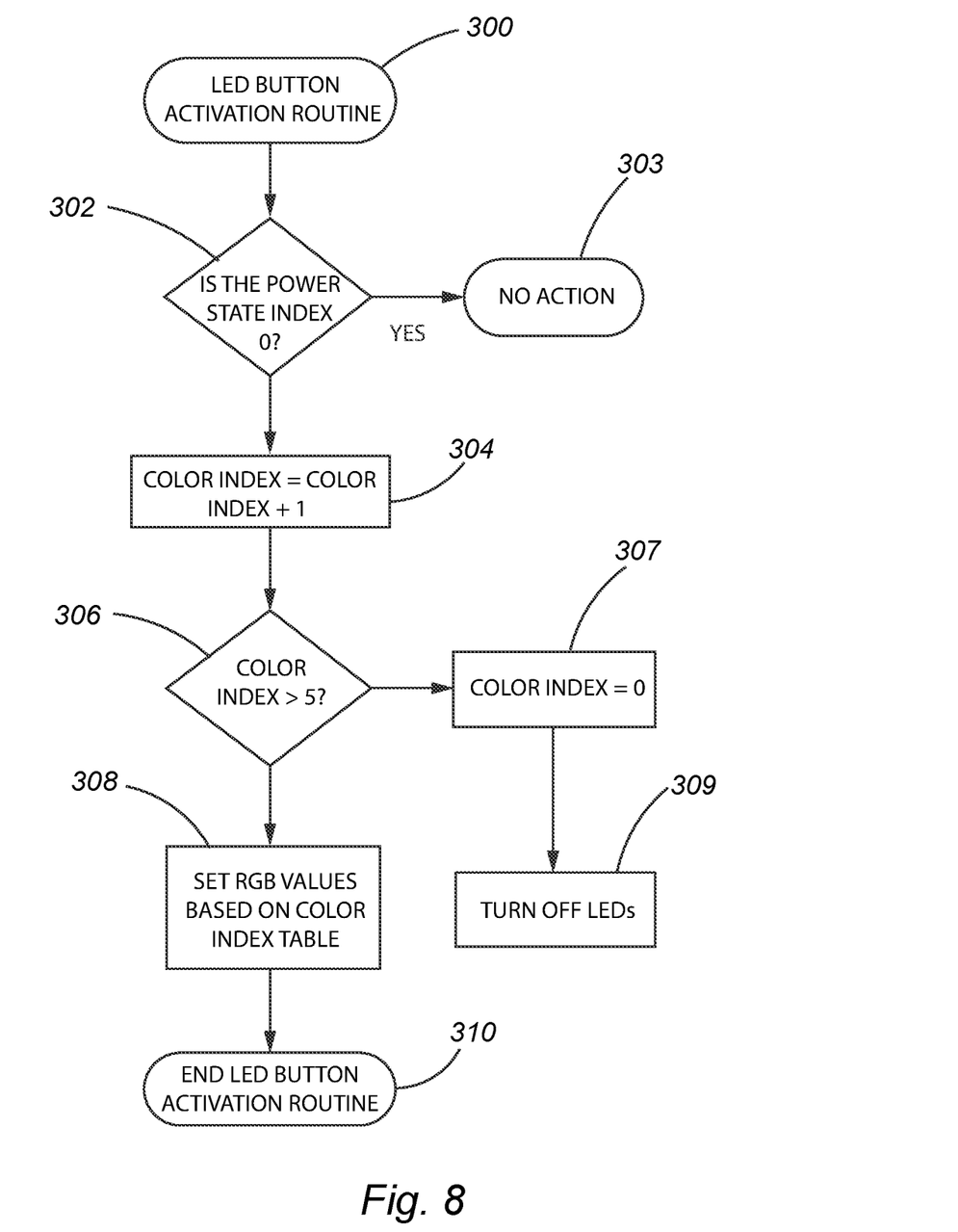
FIG. 8 is a logic flow chart showing an LED button activation routine for an aroma therapy device according to embodiments of the disclosure.
Figure 9:
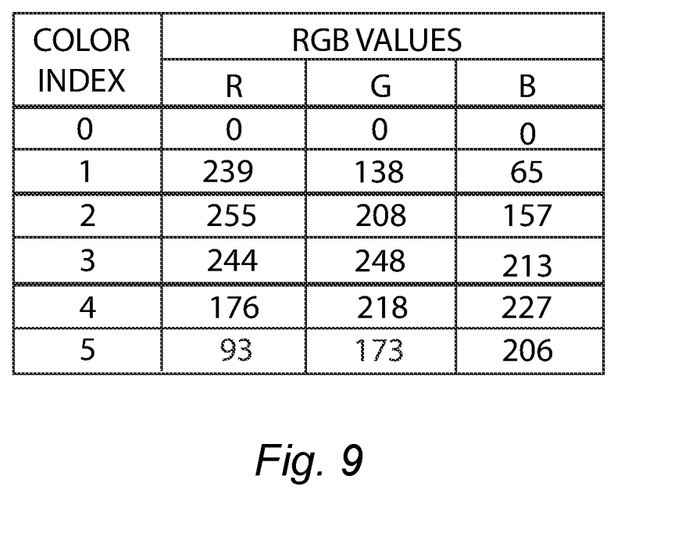
FIG. 9 is a chart showing RGB values for color index settings for an aroma therapy device according to embodiments of the disclosure.

FIGS. 8 and 9 show, respectively, a flow diagram of the LED button activation routine and chart associating the color index with selected Red, Green, Blue (RGB) values. According to one embodiment, LEDs 32 are selected to output red, green, and blue light. By providing different amounts of current to each of the LEDs, the device is illuminated with a selected color that results from the mixing of red, blue and green light. It is contemplated these values may be adapted to provide a different combination of RGB values to display different colors. As discussed with respect to FIG. 5, pressing LED button 43 causes the LED button actuation routine to start at step 300. At step 302, controller 50 determines if the power state index is 0, meaning that the device is in the OFF state. If so, no action is taken at step 303 and the routine terminates, returning to step 108 in FIG. 5 to await a button press. If the power state index is not 0, at step 304, controller 50 increases the color index by 1. At step 306, controller 50 determines if the color state index is greater than 5. If not, at step 308, controller 50 sets the power provided to LEDs 32 to selected values so that amounts of red, blue and green light mix to generate a selected color. FIG. 9 shows an exemplary table of RGB values corresponding to selected color index values. At step 310, the routine ends and controller 50 returns to step 108, shown in FIG. 5 to await a subsequent button press. If at step 306, the controller 50 determines that the color index has exceeded 5, at step 307, the color index is reset to zero and at step 309, all LEDs are turned off. Again, control returns to step 108 to await a button press. The LED activation routine is cycled through with each actuation of the corresponding input device, e.g., pushbutton switch 43. For example, if the color state index is "1" and the pushbutton switch 43 is actuated, the device cycles to color index "2." Each actuation of the pushbutton switch 43 cycles the color index to the next color index. In the embodiment shown, if the device is on color index "5," the next actuation of the pushbutton switch 43 cycles the device back down to color index "0." In this exemplary embodiment, five color index levels are provided but a greater or fewer number of color index levels are within the scope of the disclosure. In addition, color levels for three LEDs (red, green, and blue) are described, but other colored LEDs (e.g., yellow, orange) could be provided within the scope of the disclosure.

Figure 10:
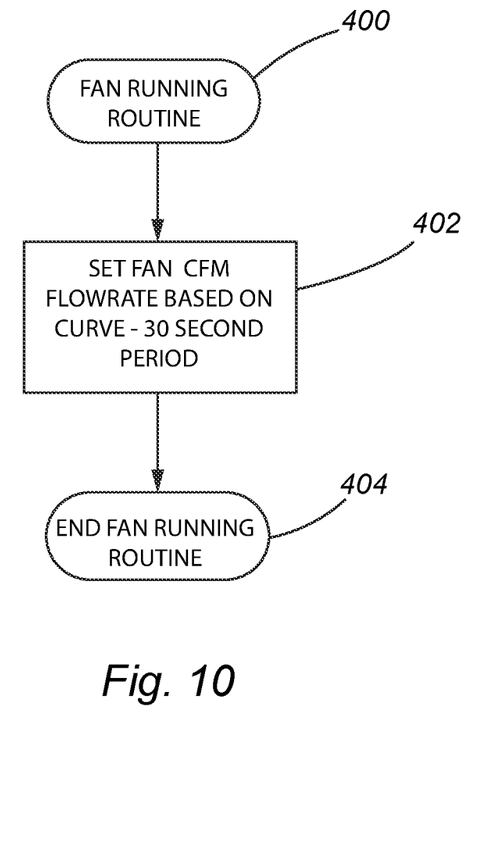
FIG. 10 is a logic flow chart showing a fan running routine for an aroma therapy device according to embodiments of the disclosure.
Figure 11:
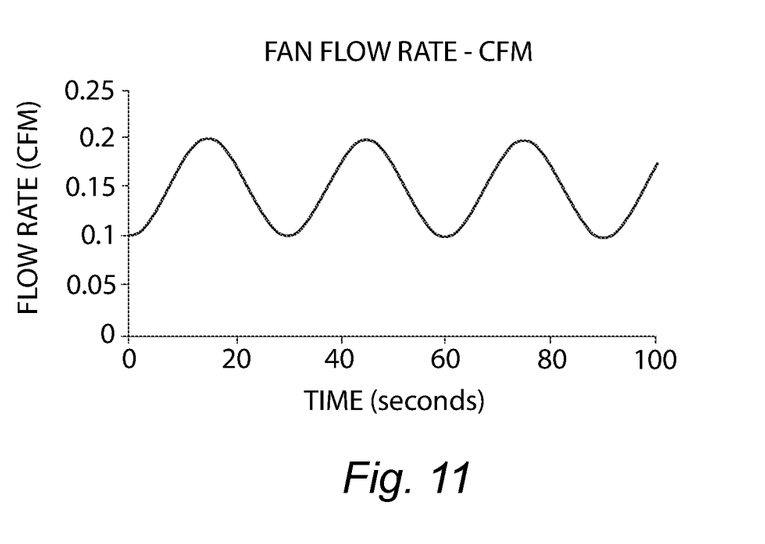
FIG. 11 is a graph showing a time-varying fan speed for control of a fan for an aroma therapy device according to embodiments of the disclosure.

FIG. 10 shows the fan running routine according to an embodiment of the disclosure. As discussed above, at step 205 of the power button activation routine shown in FIG. 6, the fan running routine is initiated. The routine starts at step 400. At step 402, controller 50 sets the speed of fan 34 to a selected value. According to one embodiment, the speed of fan 34 is selected to a single constant value. According to another embodiment, various constant fan speeds may be selected, for example, to correspond with the power state index discussed above. According to a preferred embodiment, fan speed is selected based on a time varying function to provide a pleasing variation in the flow of mist across opening 11 of lid 10. FIG. 11 shows an exemplary chart illustrating one such time-varying function, a sinusoidal variation with a period of about 30 seconds. Different time varying functions and different periodicity in fan speed could be provided within the scope of the disclosure. In addition, controller 50 may be programmed to vary fan speed according to a non-periodic function or to vary the speed randomly.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims. Therefore, the description should not be construed as limiting the scope of the invention.

What is claimed is:

1. An aromatherapy device comprising:
a main body defining a reservoir adapted to contain a liquid;
a lid connected with the main body and defining at least one opening, wherein the lid is configured to guide a flow of air past the at least one opening;
a recapture bowl positioned within the lid, wherein the flow of air impacts a surface of the bowl, wherein the recapture bowl comprises a drain hole, and wherein the drain hole is positioned above the reservoir;
an air passage defined within the main body and configured to direct the flow of air across a surface of the liquid in the reservoir and into the lid;
a fan in fluid communication with the air passage and adapted to drive the flow of air; and
at least one atomizing element connected with the reservoir and adapted to atomize the liquid, wherein the atomized liquid is entrained in the air flow, travels past the opening of the lid and impacts the surface of the recapture bowl.

2. The aromatherapy device of claim 1, further comprising a controller coupled with the at least one atomizing element and an input device coupled with the controller, wherein actuation of the input device causes the controller to adjust a rate at which the liquid is atomized.

3. The aromatherapy device of claim 2, further comprising a light emitting diode (LED) array coupled with the controller, wherein actuation of the input device causes the controller to illuminate the LEDs according to a selected one of a plurality of LED color patterns.

4. The aroma therapy device of claim 2, further comprising a low fluid sensor coupled with the controller and configured to detect an amount of the liquid in the reservoir, wherein, in response to the amount of liquid below a threshold, the controller deenergizes the at least one atomizing element.

5. The aroma therapy device of claim 4, wherein, in response to the amount of liquid below the threshold, the controller actuates a light emitting diode (LED) array to cause an alert signal.

6. The aromatherapy device according to claim 5 wherein the alert signal comprises an audible, haptic, or visual signal.

7. The aromatherapy device according to claim 1, wherein the at least one atomizing element comprises an ultrasonic atomizer, a heat atomizer, or a nebulizer.

8. The aromatherapy device of claim 1, wherein the liquid comprises water and an essential oil.

9. The aromatherapy device according to claim 1, wherein the reservoir defines a toroidal shape.

10. The aromatherapy device according to claim 9, wherein at least a portion of the air passage extends through the center of the toroidal shape.

11. The aromatherapy device according to claim 10, wherein the air passage further comprises an umbrella disposed at a distal end of the air passage, wherein air flowing through the air passage is directed in a proximal direction toward the surface of the liquid by the umbrella.

12. The aromatherapy device according to claim 1, wherein the lid comprises an inwardly sloping surface surrounding the at least one opening.

13. The aromatherapy device according to claim 1, wherein the recapture bowl comprises one or more flutes and wherein the flutes contact the lid to define a gap.

* * * * *